April 13, 1965   J. H. KUCK   3,178,708
OPTO-ELECTRONIC PANEL DATA PROCESSOR
Filed Sept. 15, 1961   4 Sheets-Sheet 1
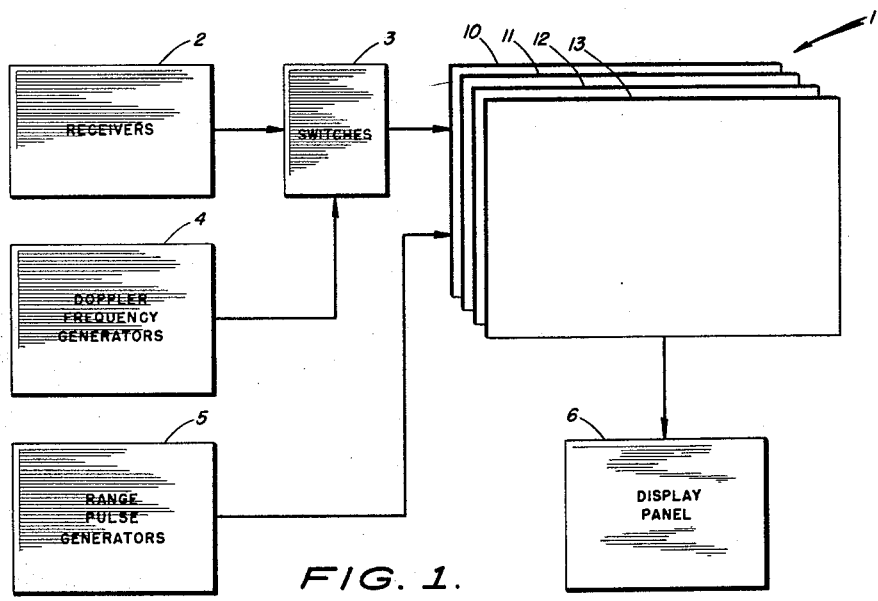
FIG. 1.
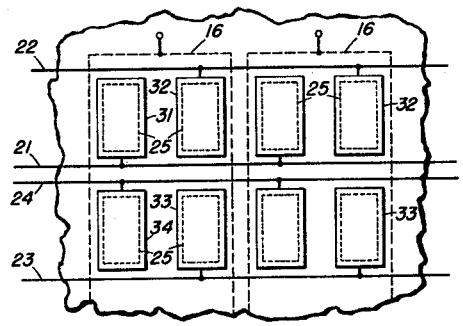
FIG. 4.
FIG. 5.
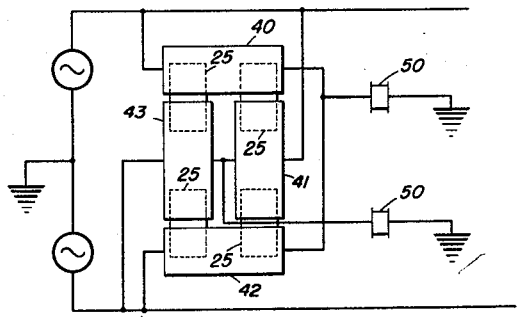
INVENTOR
JOHN H. KUCK
BY
ATTORNEYS April 13, 1965 J. H. KUCK 3,178,708
OPTO-ELECTRONIC PANEL DATA PROCESSOR
Filed Sept. 15, 1961 4 Sheets-Sheet 2
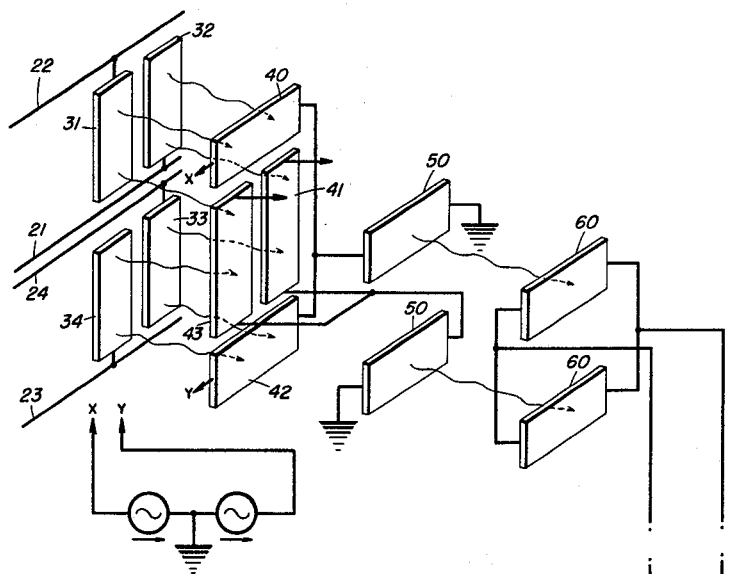
FIG. 6.
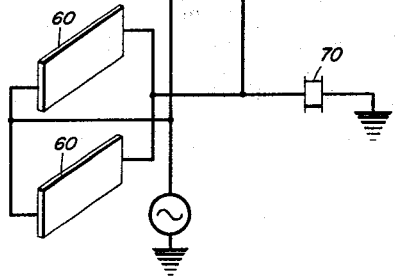
FIG. 2a
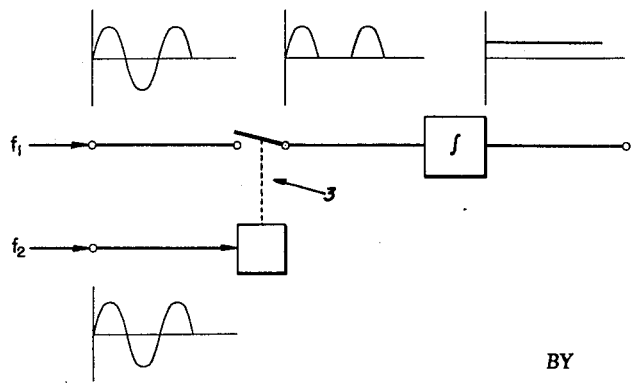
INVENTOR
JOHN H. KUCK
BY W. O. Quesenberry
Claude Funkhouser
ATTORNEYS

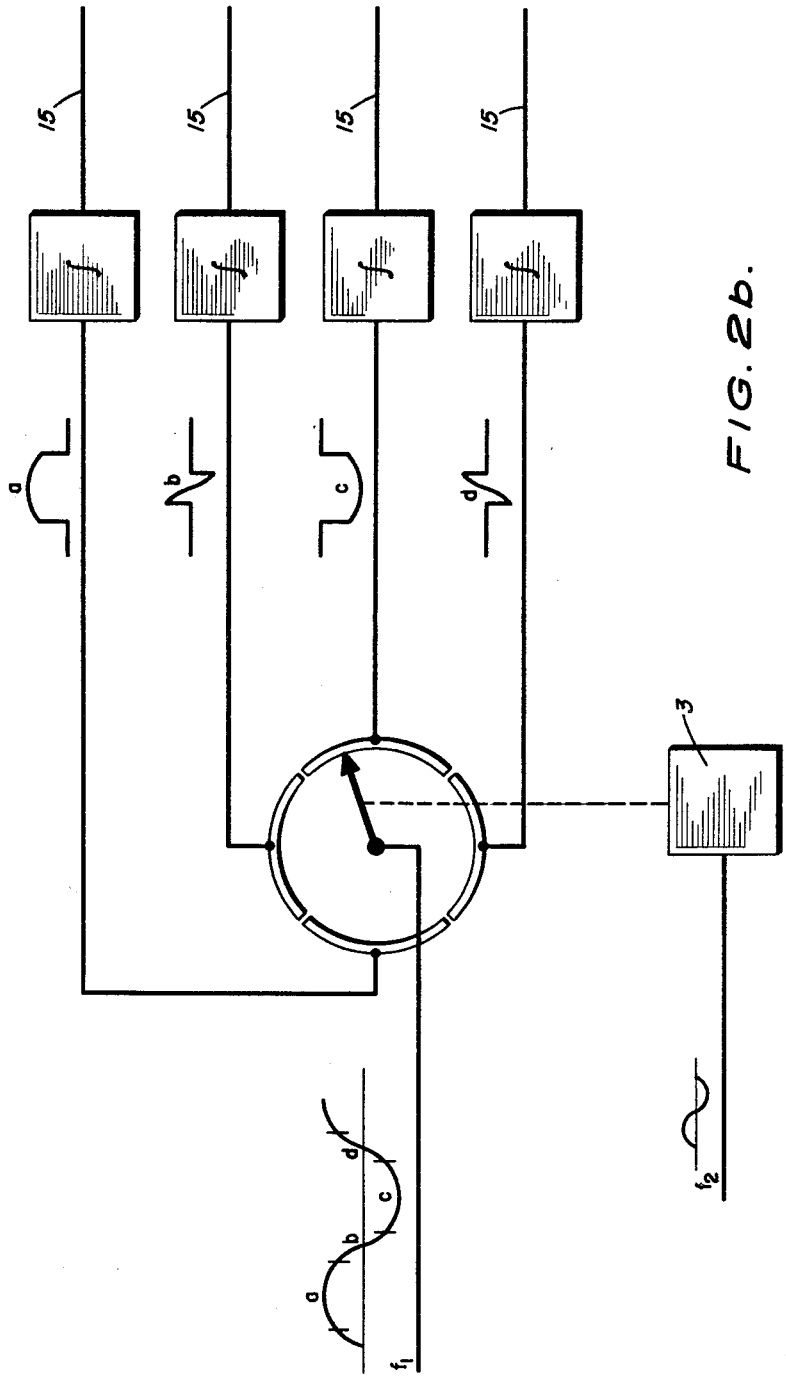

United States Patent Office 3,178,708
Patented Apr. 13, 1965

3,178,708
OPTO-ELECTRONIC PANEL DATA PROCESSOR
John H. Kuck, Silver Spring, Md., assignor to the United States of America as represented by the Secretary of the Navy
Filed Sept. 15, 1961, Ser. No. 139,335
8 Claims. (Cl. 343—7.7)

The present invention relates in general to Doppler radar systems and indicator devices. More particularly, the invention relates to a data processor for performing multichannel range gating and Doppler filtering operations in a range Doppler acquisition system.

In order to meet problems in tactics and countermeasures, defense radar should include specific characteristics such as frequency diversity, Doppler discrimination, short pulse lengths and high power. Present day defense radar systems, particularly those which provide the combined functions of early warning and defense missile guidance, are highly subject to enemy jamming. A Doppler system has been proposed wherein the radar signal is composed of a large number of short successive pulses of high power and each having a different randomly selected frequency. The signal returned from a target will contain all of the frequencies of the original signal each shifted in frequency according to the well-known Doppler principle. The pulses may then be separated and detected individually to determine the Doppler signal. If in addition to frequency diversity, a means for range discrimination is incorporated in the system the possibility of enemy jamming will be greatly reduced.

The problems of range gating and Doppler filtering in a multifrequency acquisition system are highly complex. Such a system requires countless numbers of gates and filters, which numbers become greatly multiplied as the number of frequencies employed is increased. The number of these elements required in an effective system is so large that the greatest possible degree of simplification and miniaturization is necessary.

It is therefore a primary object of the invention to provide a means for accomplishing both range gating and Doppler filtering which is simple and compact.

Another object of the invention is to provide a range gating and Doppler filtering device capable of simultaneously handling a large number of different signals of varying frequency.

A further object of the invention is to provide a range gating and Doppler filtering device which will provide an optical output display.

Still a further object of the invention is to provide a range gating and Doppler filtering device well-suited to the multiplex operation of simultaneously handling signals from a plurality of targets which may vary greatly in both velocity and range.

Other objects and many of the attendant benefits of this invention will be readily appreciated as the same becomes better understood by reference to the following detailed description when considered in connection with the accompanying drawings in which:

FIG. 1 is a block diagram of the data processor comprising the invention;

FIG. 2a is a schematic diagram illustrating synchronous switch detection;

FIG. 2b is a schematic diagram illustrating synchronous switch detection with one-quarter cycle sampling;

FIG. 4 is a detailed schematic representation of a portion of one of the data panels forming part of the invention;

FIG. 5 is a detailed schematic representation of a portion of two data panels forming part of the invention; and FIG. 6 is a schematic representation of one filter channel in the data panel.

Figure 3:
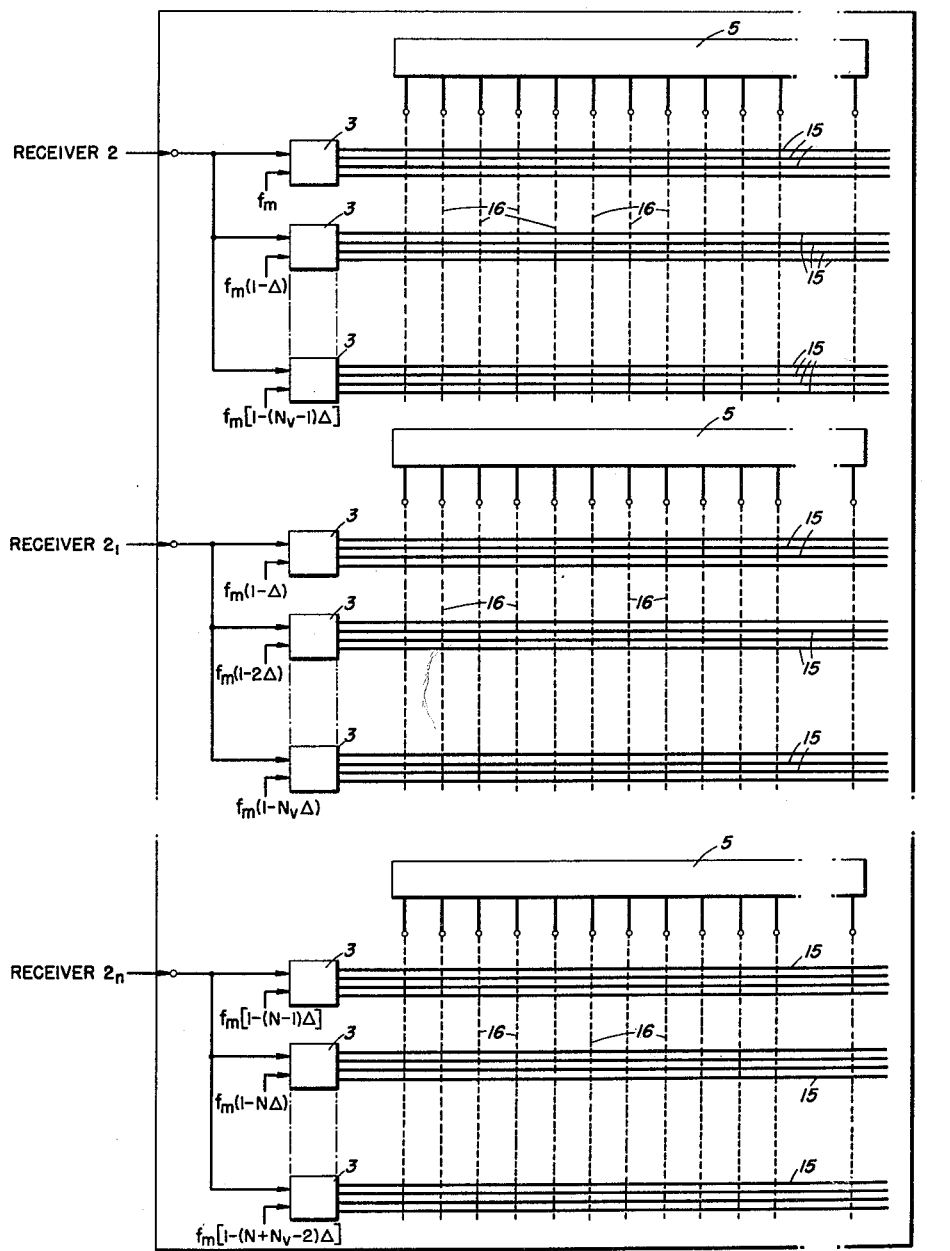
FIG. 3 is a schematic diagram of the wiring layout for a portion of the data panel according to the invention.

In the system of which the present invention is a component part a plurality of coherent frequencies are transmitted in a random fashion in search of possible targets. However, with the use of frequency diversity, the problems of range gating and Doppler discrimination become very complex. For example, if fifty frequencies are transmitted and a thousand different target velocities are monitored, fifty thousand Doppler gates will be needed for each value of range considered. In other words, if four targets exist at a single given range and each of these targets is moving at a different velocity, four Doppler signals of different frequency will be received. However, given similar circumstances with the four targets moving at the same velocity and the return from each target based on a different transmitted frequency, four Doppler signals different from each other and from the first set will be received. It is easily seen how fifty thousand different combinations could be derived under these circumstances.

The invention proposes a data processor utilizing combinations of electroluminescent elements and photoconductor elements to perform the multichannel range gating and Doppler filtering operations required. These elements are arranged in the form of a panel in an attempt to provide simplification and miniaturization of the numerous functional elements needed.

FIG. 1 shows the overall system of the invention and each of the major elements therein in block form. The heart of the system is a four-layer panel 1, which is made up of alternate layers of small electroluminescent and photoconductive elements plus electrical conductors to provide the required electrical excitation voltages to these elements. Layers 10 and 12 of the panel contain electroluminescent elements, while layers 11 and 13 contain photoconductor elements.

The radar signal which is returned from the target is applied to a plurality of tuned receivers 2 which separate the signal into individual channels according to frequency. One receiver must be provided for each frequency channel provided in the system. Thus if the transmitted signal contains fifty frequencies, fifty receivers tuned to those frequencies will be required in the system. The signal from each receiver is then applied to a particular series of synchronous switches 3 which are in turn controlled by an equal number of Doppler frequency generators 4. The switches 3 along with their associated electroluminescent and photoconductive elements on the panel 1 perform the required range gating and Doppler filtering operations in a manner to be described. A plurality of signals are derived from layer 13 in panel 1 and applied to an electroluminescent output display panel 6, which displays all targets encountered in accordance with their velocity and range.

It is well-known that the intensity of the light output from an electroluminescent element is a rapidly increasing function of the applied excitation voltage. If a multiplicity of mutually perpendicular conductors are painted on opposite sides of an electroluminescent panel, and equal and opposite polarity voltages are applied to one conductor on each side of the panel, the light emitted at the point where the pair of excited conductors cross will be much brighter than at other intersection points along the conductors. This is true because the electric field in the material at the excited intersection is twice as great as at other intersections and the nonlinearity of the electroluminescent response amplifies this difference. Thus a bright spot could be produced at any desired point in the panel by excitation of the appropriate pair of conductors. This phenomenon is utilized to provide range gating in the panel 1.

The Doppler filtering operation is accomplished in a similar manner to synchronous switch detection. A synchronous detector is a detector which is sensitive only to signals at or near to a given frequency. This frequency is identical with the frequency of a control signal supplied independently to the switch detector. If the phase of the signals is identical, the switch will perform a rectification or detection operation on the incoming signal. This procedure is shown schematically in FIG. 2a. A control signal of fixed frequency $f_2$ is applied to a synchronous switch 3 and controls the opening and closing of the switch. The Doppler signal $f_1$ is applied to the main terminals of the switch 3 which will pass only portions of the signal depending on the control freqeuncy. If $f_1=f_2$ and the signals are in phase, the Doppler signal will be rectified and the integrator 4 will produce a direct current signal proportional to the Doppler level.

However, in the proposed system there can be no assurance that the Doppler signal will enter the switch in phase with the control signal, since this would require a knowledge of the exact range and velocity of the target, which is not known. As a result, the invention proposes that the incoming signal be sampled at quarter cycle intervals and the samples be subtracted and detected in such a manner that, given frequency coincidence between the return signal and the control signal, a proper integrated output level will be produced regardless of phase differences between these two signals. The manner in which this is accomplished will be explained more fully in connection with FIGS. 2b, and 3 through 6.

FIG. 2b is a schematic diagram illustrating the manner in which an input signal is synchronously detected every quarter cycle of a control signal, to which it is compared. A control or reference signal $f_2$, of fixed frequency, is applied to the schematically illustrated synchronous switch 3. The frequency of signal $f_2$ controls the speed of rotation of the switch wiper arm and, therefore, the rate or speed at which input signal $f_1$ is sampled. The switch 3 has four contacts, each contact being formed in the shape of an arc of substantially 90°. The wiper, therefore, will travel for one-fourth of the period of signal $f_2$ over each of the contacts. The spacing between the contacts is made as small as possible in order to obtain a dwell period which is substantially equal to one-fourth of the period of signal $f_2$. Each of the contacts is electrically coupled through an associated integrating circuit to the electroluminescent panel display, in a manner identical to the output of switch 3 as shown at FIG. 2a.

Signal $f_1$ is illustrated as divided into four sampling periods of equal time duration, the duration of which is determined by the frequency of signal $f_2$ as discussed above. The portions of signal $f_1$ sampled during each of these four periods are designated in FIG. 2b as samples $a-d$, respectively. Each integrating circuit receives a zero level signal from its associated contact during 270° of rotation of the wiper arm. During one-fourth of the period of rotation of the wiper arm, each contact is electrically connected to input signal $f_1$ and provides its associated integrating circuit with one of the sampled portions $a-d$. As may be seen from FIG. 2b, these sampled portions of signal $f_1$ may vary in polarity, but are always discrete signals rather than zero level signals. In this manner, discrete samples of signal $f_1$ are constantly provided, regardless of the phase difference between signals $f_1$ and $f_2$.

Of course, if the Doppler signal is of a different frequency from the control signal, the waveform which emerges from switch 3 will contain both positive and negative components in substantially equal proportions which when integrated will produce a zero, or substantially zero, direct current level.

In a Doppler radar system the exact frequency of the return signal is dependent upon the frequency of the transmitted signal and the velocity of the target. Since this velocity is not known, a large number of switches each operating at different Doppler frequencies within a band estimated according to possible target velocity will be required for the detection operation. In a multichannel system, this large number of switches must be duplicated for each frequency included in the transmitted signal.

Looking more closely to the panel 1, FIG. 3 shows layer 10 of the panel along with its required circuitry. The receiver output signals are fed through the synchronous switches 3 to horizontal lines 15 on one side of the panel and range pulses are fed by range pulse generator 5 to vertical lines 16 on the other side of the panel. Each horizontal line represents a range display. The lines are arranged in groups of four, each group being connected to a separate selector switch 3. Each switch selects one line at a time in sequence at a rate determined by the frequency of a switching signal that is fed into the switch. The switch functions like a continuously rotating, mechanical selector switch having one pole and four positions.

Each switch 3 with its associated elements in the sandwich panel performs the gating and filtering operations required for one velocity resolution interval for one receiver and all ranges. Because of the large number of these switches required, the invention proposes the use of micro-miniatured transistor switches deposited directly on the sandwich panel. However, any known switch having a single input and four outputs will work satisfactorily. For example, mechanical commutator switches or beam switching tubes can be used. The time required for each switch to pass through a complete switching cycle is equal to the period of the expected Doppler frequency, as determined by the transmitted frequency for that channel and the target velocity interval that the channel is assigned to cover. Thus, each line is energized in turn for a quarter cycle of the expected Doppler frequency.

Each switching signal frequency may either equal the designated Doppler frequency for its switches or more likely will be four times this frequency assuming that the switch circuit is so constructed as to require a trigger pulse for each of the four steps in a complete switching cycle.

If the proper relationship between the separation of velocity gates and the separation of transmitted frequencies is chosen, the number of switching frequencies required can be greatly reduced. This is illustrated in FIG. 3. Each switch connected to receiver 2 is for a different target velocity. Therefore, switching signals to adjacent switches are separated by $f_m\Delta$ where $f_m$ is the maximum Doppler frequency and $\Delta$ is the ratio of the separation between Doppler frequencies to the maximum Doppler frequency. The separation between target velocities of adjacent channels is therefore $v_m\Delta$ where $v_m$ is the maximum target velocity that the system can handle. As a result, there is a considerable duplication of the switching frequencies required for the various lines from different receivers.

In FIG. 3, the difference between adjacent transmitter frequencies has been deliberately chosen to be $F_m\Delta$ where $F_m$ is the maximum transmitted frequency. This causes the switching frequencies from the switches of receiver 2' to be separated from the frequencies of the corresponding receiver 2 switches by $\Delta f_m$. As a result, all but one of the switching frequencies of receiver 2' are duplicates of the frequencies needed for the receiver 2 switches. The result of this duplication throughout the system is that the total number of switching frequencies required is reduced from $NN_v$ to $N+N_v$, where $N$ is the number of receivers and $N_v$ is the number of velocity gates.

Let us now consider the method by which the horizontal lines will generate range displays. Properly timed range pulses are supplied in sequence to each of the vertical lines 16 on the reverse side of layer 10 by range pulse generator 5. The amplitude of these pulses will be such that the electroluminescent light output due to this voltage is about one-half the maximum level for the material. Thus, light pulses will be emitted in sequence from each vertical line. The maximum output voltage of the receivers 2 is considerably less than the range pulse amplitude. Thus, because of the non-linear character of the electroluminescence the light emitted along a horizontal line due to the receiver output will be negligibly small. However at any point of intersection of the vertical and horizontal lines where there is time coincidence between an output pulse from a receiver 2 due to a target and a range pulse, the two voltages will either add or subtract, causing the light pulse at such an intersection point to be either brighter or darker than at other intersection points. Thus, it is apparent that Doppler frequency modulation will appear on the light pulses only at those intersection points along the one vertical line which is located at the position corresponding to the target range.

The detailed arrangement of the electroluminescent materials and the electrical conductors at the intersection of one range pulse line with a group of four receiver lines in layer 10 of panel 1 is shown in FIG. 4. The lines 21, 22, 23, and 24 are part of a single velocity group and are energized by the same switch 3. The vertical conducting strips which receive the range pulses from the range pulse generator are indicated at 16, each strip representing a different increment of range. The electroluminescent material 25 is contained in rectangular holes in a sheet of non-luminescent insulating material 26. These electroluminescent elements may be made from any of the commonly known phosphor powders normally used in display panels and light amplifier panels which produce the intrinsic electroluminescent phenomenon. This phenomonon and the types of materials which are used in this type of application are discussed in the Proceedings of I.R.E., 1955, in an article by G. Destriau and H. F. Ivey entitled, "Electroluminescence and Related Topics," page 1911. The horizontal conductors 21, 22, 23, and 24 are connected to rectangular conductive strips 31, 32, 33 and 34, respectively. The vertical conducting strips 16, the electroluminescent rectangles 25, and the rectangular conductive strips are all in registration so as to permit electrical excitation of the electroluminescent rectangles 25. The arrangement indicated is schematic, thus the actual physical layout may be different provided the necessary functions are performed. The rectangular conducting strips connected to the horizontal lines are transparent to permit the light signal to pass through to layer 11, which contains the integrating photoconductors.

As was already mentioned, each horizontal line is energized in turn for a quarter cycle of the expected Doppler frequency. Thus, the conducting strips 31, 32, 33, and 34 will be energized successively for a quarter cycle each which in turn energize the electroluminescent rectangles 25 providing four distinct light signals modulated in accordance with the four quarter cycle samples of the applied Doppler signal.

FIG. 5 shows how the photoconductor elements 40 of layer 11 are arranged with respect to the elements on layer 10. According to the invention these photoconductors 40 are used as integrators and should have an integration time of the order of at least .01 second. It appears that the CdS photoconductor has this required integration time and is suitable for the purposes of the invention. The use of such a photoconductive material in light amplifier panels is found in the Proceedings of the I.R.E., 1955, in an article by B. Kazan and E. H. Nichols entitled "An Electroluminescent Light Amplifying Picture Panel," page 1888. In the light amplifier each photoconductor element is electrically connected in series with an electroluminescent element across a source of alternating excitation voltage. An input light signal falling on a photoconductor element varies the resistance of the photoconductor and thus controls the amount of excitation voltage applied to the associated electroluminescent element and the amount of light emitted by it. The control function is such that light amplification results.

The arrangement of photoconductors 40 through 43 with respect to the electroluminescent elements 25 is such that each photoconductor element will receive light from one-half the area of each of two of the electroluminescent elements 25 in layer 10. As can be seen from FIG. 5, photoconductor element 40 will receive modulated light signals for the first two quarters of the switching cycle; element 41 will receive modulated light signals for the second and fourth quarters of the switching cycle; element 42 will receive modulated light signals for the third and fourth quarters of the switching cycle; and element 43 will receive modulated light signals for the first and third quarters of the switching cycle. Thus, each of the four photoconductors 40 through 43 in a group will receive signal modulated light for a time interval of one-half of the switching cycle. As previously mentioned the photoconductive elements used in the panel 1 act as integrators; thus, the output signals applied to each of the elements 40 through 43 will be continuously integrated.

Equal, but oppositely polarized, A.-C. voltages are applied to the open ends of the two series connected photoconductors in the pair which includes photoconductors 40 and 42 and in the pair which includes photoconductors 41 and 43 and the difference current, which can be taken from the junction between the two elements, is passed through a single electroluminescent element 50 in layer 12. There will be a difference current only when the resistances of the two photoconductors are unequal as a result of unequal illumination. This condition will arise when a modulated light signal is received having the same frequencies as the switching signal and a phase relative to the switching signal such that one photoconductor receives a signal during a positive half cycle of the modulation and the other during the negative half cycle. Obviously, if the frequency of the received signal is not nearly equal to the frequency of the switching signal, a zero integrated output will result, since unequal illumination of the photoconductor elements will not be possible. If the frequency and the phase of the received signal is identical to the switching frequency, the combined outputs from elements 40 and 42 will equal the first quadrant plus the second quadrant minus the third quadrant minus the fourth quadrant of the received signal which amounts to a full wave rectification of the received signal. The combined outputs from elements 41 and 43 for these conditions will be zero since it will represent quadrant two plus quadrant four minus quadrant three minus quadrant one. However, if the phase of the received signal is shifted 90° with respect to the switching signal, elements 41 and 43 will produce a full wave rectified output while elements 40 and 42 produce a zero output. For intermediate phase differentials between 0° and 180°, one of the pairs of photoconductive elements will produce a proper output. Of course the phases considered above are only initial phase differences between the received signal and the switching frequency. Because the received signal is derived from a moving target, its phase will be constantly changing with respect to the phase of the switching signal, however, as long as the frequencies are substantially equal an output signal of the proper level will be produced by the photoconductive elements 40 through 43. Since the electroluminescent light output of the elements 50 in layer 12 depends only upon the magnitude and not on the algebraic sign of the difference current, this element may be said to perform a detection operation on the signal.

FIG. 6 shows the signal flow in one filter channel of the panel 1. The light output of each of the photoconductive elements 40 through 43 in layer 12 is received by a separate photoconductor element 60 in layer 13. The elements 60 in layer 13 are supplied with an A.-C. excitation voltage. Groups of elements 60 associated with each receiver and representing identical target range and velocity coordinates will be electrically interconnected in such a way that the electrical signals resulting from the incident light signals will be added. The resultant electrical signal from each group of elements 60 in layer 13 will be connected to a single electroluminescent element 70 in a display panel 6, providing a visual indication of that target according to its velocity and ranges.

The addition of the electrical signals in layer 13 can be accomplished by either a series or parallel connection of the elements 60. The parallel connection may be preferred since an open-circuit in a given element will not disable the group. In addition, the parallel connection brings all elements to the same average potential and one end of each element is grounded. Therefore, the parallel connection may reduce stray pick-up problems.

The general theory of operation is as follows. Target signals from the receivers enter layer 10 through switches 3 and produce modulation of the flashes of light from all elements in the layer, which are located along a vertical line in FIG. 3, at the horizontal position that corresponds to a given target range. This operation is achieved as a result of the fact that the range gate generator associated with each receiver furnishes a multiplicity of separate range pulses—one for each range interval. There is a separate range gate generator for each receiver.

The amplitude of the range gate pulse will be greater than the maximum amplitude of the video output pulses from the receivers. Thus, each element 25 of the panel will produce light flashes due to the range gate pulses. When there is time coincidence between a range gate pulse and a receiver pulse, the brightness of the flash at the elements 25 where coincidence occurs will be increased or decreased depending on the polarity of the receiver pulse.

The light signals from the various elements in layer 10 will effectively be carried in separate optical channels, one of which is illustrated in FIG. 6. Each of these channels can act as a separate Doppler filter which will produce maximum output only if the frequency of the input signal from the receiver is close to or equal to the switching frequency. As the information carrying signals progress through the filter channel, these signals exist alternately in the form of light signals and as electrical voltages. The output from each filter channel in the panel 1 represents a target at a particular range and velocity. Because of the multiple frequency transmission and the subsequent reception of these signals by separate receivers, there should be an output from one filter channel, such as shown in FIG. 6, for each transmitted frequency. These filter channels are summed and the resulting signal is applied to a point on display panel 6 which corresponds to the range and velocity of that target considered. It can thus be seen that with the system of the instant invention many targets can be considered at one time without introduction of the normally resulting ambiguities.

Obviously, many modifications and variations of the present invention are possible in the light of the above teachings. It is therefore to be understood that within the scope of the appended claims the invention may be practiced otherwise than as specifically described.

What is claimed is:

1. In a multichannel radar receiving system, a combination range gate and Doppler filter comprising a plurality of synchronous switches receiving Doppler signals of different frequency and selectively applying a quarter sample of each cycle to four switch output lines, a range gate in each of said switch output lines, a range generator connected to said range gates for controlling operation of said gates, means for integrating each of said quarter samples, means for subtracting alternate integrated quarter samples connected to said integrators, a detector connected to each subtracting means, and means for separately adding the output of all detectors in each channel.

2. A multichannel radar receiving system as recited in claim 1, wherein each of said synchronous switches is operated at a different preselected Doppler frequency and each of said range gates, integrating means, subtractors, detectors, and adders are incorporated into a sandwich panel containing alternate layers of electroluminescent and photoconductive elements.

3. In a multichannel radar receiving system, a combination range gate and Doppler filter comprising, a plurality of synchronous switches receiving Doppler signals of different frequency, a range gate connected to the output of each of said switches, means for integrating the output of each range gate, means for combining the outputs of said integrating means so as to eliminate the effect of phase changes in said Doppler signals, and means for detecting the outputs of said combining means and for adding all signals having the same range and velocity coordinates.

4. In a multichannel radar receiving system, a combination range gate and Doppler filter comprising, a plurality of tuned receivers each receiving a radar signal of different frequency, a plurality of synchronous switch detectors connected to each of said receiver outputs, means associated with each switch for dividing each cycle of the incoming signal from each receiver into four equal samples, adding means for combining the samples in four different pair combinations, integrators connected to each adding means, means for subtracting the integrated signals in two different pair combinations, detecting means connected to each subtracting means, and means connected to said detecting means for adding all signals in the same channel.

5. A multichannel radar receiving system as claimed in claim 4, wherein each of said adding means, integrators, subtracting means, and detecting means are incorporated into a data panel made up of alternate layers of electroluminescent and photoconductive elements arranged so as to perform the required functions.

6. In a multichannel radar receiving system, a combination range gate and Doppler filter comprising, a plurality of tuned receivers each receiving a radar signal of different frequency, a plurality of Doppler frequency generators associated with each of said tuned receivers, a plurality of synchronous switch detectors connected to each of said tuned receivers and each driven by a different one of said Doppler frequency generators, each of said switch detectors having four outputs representing four different quadrants of the applied signal, range gate means connected to the four outputs of each switch detector, an integrator connected to the outputs of each of said range gate means, means for combining the four integrated outputs associated with each switch detector so as to eliminate the effect of phase changes in said Doppler signals, means for detecting the output of each combining means, means connected to said detecting means for adding the signals from all detecting means representing a common target, and an electroluminescent display panel having the output from each adding means connected thereto in a position representative of the velocity and range of each target detected by said receiving system.

7. In a multichannel radar receiving system, a combination range gate and Doppler filter comprising, a plurality of tuned receivers each receiving a radar signal of different frequency, a plurality of Doppler frequency generators associated with each of said tuned receivers, a plurality of synchronous switch detectors connected to each of said tuned receivers and each driven by a different one of said Doppler frequency generators, each of said switch detectors having four outputs representing four different quadrants of the applied signal, a range gate connected to the four outputs of each switch detector, a plurality of adding means for combining the outputs associated with each range gate into four different pair combinations, integrators connected to each adding means, means connected to said integrators for subtracting alternate pair combinations, a detector connected in the output of each subtracting means, a plurality of means connecting all of said detectors representing a common target velocity and range, and an electroluminescent display panel having the output of each connecting means applied thereto in a position representative of the velocity and range of each target detected by said receiving system.

8. In a multichannel radar receiving system, a combination range gate and Doppler filter as defined in claim 7 wherein each of said range gates, adding means, integrators, subtracting means and detecting means are made up of a data panel having alternate layers of electroluminescent and photoconductive elements arranged so as to perform the required functions.

References Cited by the Examiner

UNITED STATES PATENTS 2,508,384   5/50   Gross _____ 343—7.3

CHESTER L. JUSTUS, *Primary Examiner.*